(12) United States Patent
Becker et al.

(10) Patent No.: US 7,701,384 B2
(45) Date of Patent: Apr. 20, 2010

(54) ANTENNA SYSTEM FOR A MICRO AIR VEHICLE

(75) Inventors: Robert C. Becker, Eden Prairie, MN (US); Alan Cornett, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 213 days.

(21) Appl. No.: 12/099,559

(22) Filed: Apr. 8, 2008

(65) Prior Publication Data

US 2009/0251359 A1    Oct. 8, 2009

(51) Int. Cl.
*G01S 13/08* (2006.01)
*H01Q 1/28* (2006.01)

(52) U.S. Cl. .................. 342/120; 342/122; 342/138; 343/705; 343/708

(58) Field of Classification Search .................. 342/118, 342/120–122, 128, 134, 368–374; 343/705, 343/708
See application file for complete search history.

(56) References Cited

U.S. PATENT DOCUMENTS

| | | | | |
|---|---|---|---|---|
| 3,160,885 | A * | 12/1964 | Bernard | 342/371 |
| 3,699,574 | A * | 10/1972 | O'Hara et al. | 342/154 |
| 3,938,149 | A * | 2/1976 | Grantham | 342/94 |
| 4,101,895 | A * | 7/1978 | Jones, Jr. | 343/708 |
| 4,110,751 | A * | 8/1978 | Reggia et al. | 343/700 MS |
| 4,414,550 | A * | 11/1983 | Tresselt | 343/700 MS |
| 4,425,567 | A * | 1/1984 | Tresselt | 342/373 |
| 4,605,932 | A * | 8/1986 | Butscher et al. | 343/700 MS |
| 4,816,836 | A * | 3/1989 | Lalezari | 343/700 MS |
| 4,899,162 | A * | 2/1990 | Bayetto et al. | 343/700 MS |
| 4,912,474 | A * | 3/1990 | Paturel et al. | 342/191 |
| 4,980,692 | A * | 12/1990 | Rudish et al. | 343/700 MS |
| 5,028,930 | A * | 7/1991 | Evans | 342/373 |
| 5,128,682 | A * | 7/1992 | Kruger | 342/153 |
| 5,151,706 | A * | 9/1992 | Roederer et al. | 342/372 |
| 5,258,771 | A * | 11/1993 | Praba | 343/895 |
| 5,410,320 | A * | 4/1995 | Rudish et al. | 342/373 |
| 5,648,786 | A * | 7/1997 | Chung et al. | 343/770 |
| 6,121,925 | A * | 9/2000 | Hilliard | 342/432 |
| 6,292,144 | B1 * | 9/2001 | Taflove et al. | 343/702 |

(Continued)

FOREIGN PATENT DOCUMENTS

FR    2445042 A    7/1980

*Primary Examiner*—Isam Alsomiri
*Assistant Examiner*—Peter M Bythrow
(74) *Attorney, Agent, or Firm*—Black Lowe & Graham PLLC

(57) ABSTRACT

An antenna for a micro air vehicle (MAV) takes the form of a wrap-around antenna (e.g., wrapped around a portion of the MAV) that selectively emits radio signals in different directions depending on a frequency selected by a radio altimeter in the MAV. The radar altimeter may be a pulsed or a frequency modulated continuous wave (FMCW) radar altimeter. The wrap-around antenna includes groups of radiating elements in which at least each group includes an average height that is different from an average height of an adjacent group. Further, the average height of the group determines which group will emit the signals most efficiently so that a desired sector of space may be covered by the signals emitted from the antenna. In one example, the center frequency of the radar altimeter may be controlled in a deterministic manner to cause the radiating elements to successively cover desired sectors of space.

20 Claims, 2 Drawing Sheets

U.S. PATENT DOCUMENTS

| | | | |
|---|---|---|---|
| 6,407,711 B1 * | 6/2002 | Bonebright et al. | 343/705 |
| 6,661,378 B2 * | 12/2003 | Bloy | 342/437 |
| 6,703,975 B1 * | 3/2004 | Freeman | 342/361 |
| 6,771,218 B1 * | 8/2004 | Lalezari et al. | 342/373 |
| 6,784,838 B2 * | 8/2004 | Howell | 342/377 |
| 7,218,268 B2 * | 5/2007 | VandenBerg | 342/25 R |
| 7,295,150 B2 * | 11/2007 | Burlet et al. | 342/120 |
| 7,522,095 B1 * | 4/2009 | Wasiewicz et al. | 342/160 |
| 2003/0052828 A1 * | 3/2003 | Scherzer et al. | 343/700 MS |
| 2008/0007471 A1 * | 1/2008 | Goldberg et al. | 343/705 |

\* cited by examiner

ANTENNA SYSTEM FOR A MICRO AIR VEHICLE

BACKGROUND OF THE INVENTION

A micro air vehicle (MAV), which may also be referred to as an unmanned air vehicle (UAV), may operate in complex topologies such as mountainous terrain; urban areas; and confined spaces. By way of example, the MAV may be guided using a wireless remote control device for a variety of purposes, such as the collection of ambient gaseous particles, observation, thermal imaging, etc. MAVs may be employed by the military or police for reconnaissance, security and target acquisition operations in open, rolling, complex and urban terrain. To enhance the effectiveness and controllability of the MAV, its structural and control components should be as lightweight as possible. Some MAVs recently deployed in military operations have been about nineteen (19) inches in diameter with a dry weight of about fourteen (14) pounds. A collision with the terrain or structure has the potential to disable or damage the MAV to the extent that it may not be able to further perform its intended function and further be non-repairable.

Current MAVs are limited to flying in open areas away from urban environments and terrain obstacles because they have no ability to sense proximity hazards. An on-board proximity sensing device should be able to broadly localize obstacles in both terms of distance and direction. For larger types of airborne vehicles, the on-board proximity sensing device could take the form of a collision avoidance radar unit that includes sectoral coverage antennas and associated beam-switching hardware. Thus, the antennas take the form of multiple antennas placed on desired sectors of the airborne vehicle. One major drawback of using these types of collision avoidance radar units is that they are both large and heavy. No sensor of this type has proven to be sufficiently lightweight to be carried by the MAV.

BRIEF SUMMARY OF THE INVENTION

The present invention generally relates to an antenna for a micro air vehicle (MAV). The antenna operates with a conventional radar altimeter, which may be a pulsed or a frequency modulated continuous wave (FMCW) radar altimeter having a control means for selectively controlling a center frequency of the radar altimeter. The antenna may take the form of a wrap-around antenna (e.g., wrapped around a portion of the MAV) that selectively radiates in different directions depending on the frequency of the signal transmitted. The antenna includes radiating elements, arranged in groups according to one embodiment, having different heights that operate efficiently at different center frequencies. By controlling the center frequency of the radar altimeter in a deterministic manner, a select group of radiating elements on the antenna will radiate more efficiently and this "efficient group" may be controllably moved across the antenna to thus effectively change a direction of desired radiation emission.

In one aspect of the invention, a radar ranging system for an air vehicle includes a radar altimeter operable to selectively control a center frequency of a signal output by the altimeter; an elongated antenna having a first end, a second end and an elongated portion extending from the first end to the second end, the elongated portion having a length sufficient to permit the antenna to be wrapped around a portion of the micro air vehicle such that the first end is positioned proximate the second end; and a plurality of radiating elements coupled to the elongated antenna, the radiating elements arranged in at least two groups, each group spaced apart from an adjacent group as arranged along the length of the antenna, wherein each group has an average height that is at least slightly different than an average height of any other group, the radiating elements in signal communication with the radar altimeter and responsive to changes in the center frequency to selectively change a signal coverage area relative to a frame of reference on the micro air vehicle of a radio signal emitted from the radiating elements relative to the micro air vehicle.

In another aspect of the invention, a radar ranging system for an air vehicle includes a radar altimeter operable to selectively control a center frequency of a signal output by the altimeter; an elongated antenna having a first end, a second end and an elongated portion extending from the first end to the second end, the elongated portion having a length sufficient to permit the antenna to be wrapped around a portion of the micro air vehicle such that the first end is positioned proximate the second end; and a plurality of radiating elements arranged by height along the length of the antenna, the radiating elements in signal communication with the radar altimeter and responsive to changes in the center frequency to selectively operate a desired group of radiating elements to provide a signal coverage area relative to a frame of reference of the micro air vehicle, the signal coverage area comprising radio signals emitted from the antenna at a radio frequency corresponding to the center frequency.

In yet another aspect of the invention, a method for operating a micro air vehicle includes the steps of (1) selecting a desired frequency for a radio altimeter of the micro air vehicle; (2) controllably changing the desired frequency to move an emitted radio signal from a first group of radiating elements to a second group of radiating elements; and (3) covering a sector of space relative to the micro air vehicle with the emitted radio signals to determine a proximity of the micro air vehicle from an object.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

In the following description, certain specific details are set forth in order to provide a thorough understanding of various embodiments of the invention. However, one skilled in the art will understand that the invention may be practiced without these details or with various combinations of these details. In other instances, well-known structures and methods associated with antennas, radar emitting devices, micro air vehicles and methods of making and/or operating the same may not be shown or described in detail to avoid unnecessarily obscuring descriptions of the embodiments of the invention.

The following description is generally directed to an antenna for a micro air vehicle (MAV). The antenna operates with a conventional radar altimeter, which may be a pulsed or a frequency modulated continuous wave (FMCW) radar altimeter, having a control means for selectively controlling a center frequency of a signal outputted by the radar altimeter. The antenna may take the form of a wrap-around antenna (e.g., wrapped around a portion of the MAV) that selectively radiates in different directions depending on the frequency of the signal it transmits. Specifically and in one embodiment, the center frequency of the radar altimeter may be controlled in a deterministic manner such that a select group or groups of radiating elements on the antenna will radiate most efficiently and this "efficient group" may be made to move across the antenna from a first direction to a second direction and thus effectively change a direction of desired radiation emission.

Figure 1:
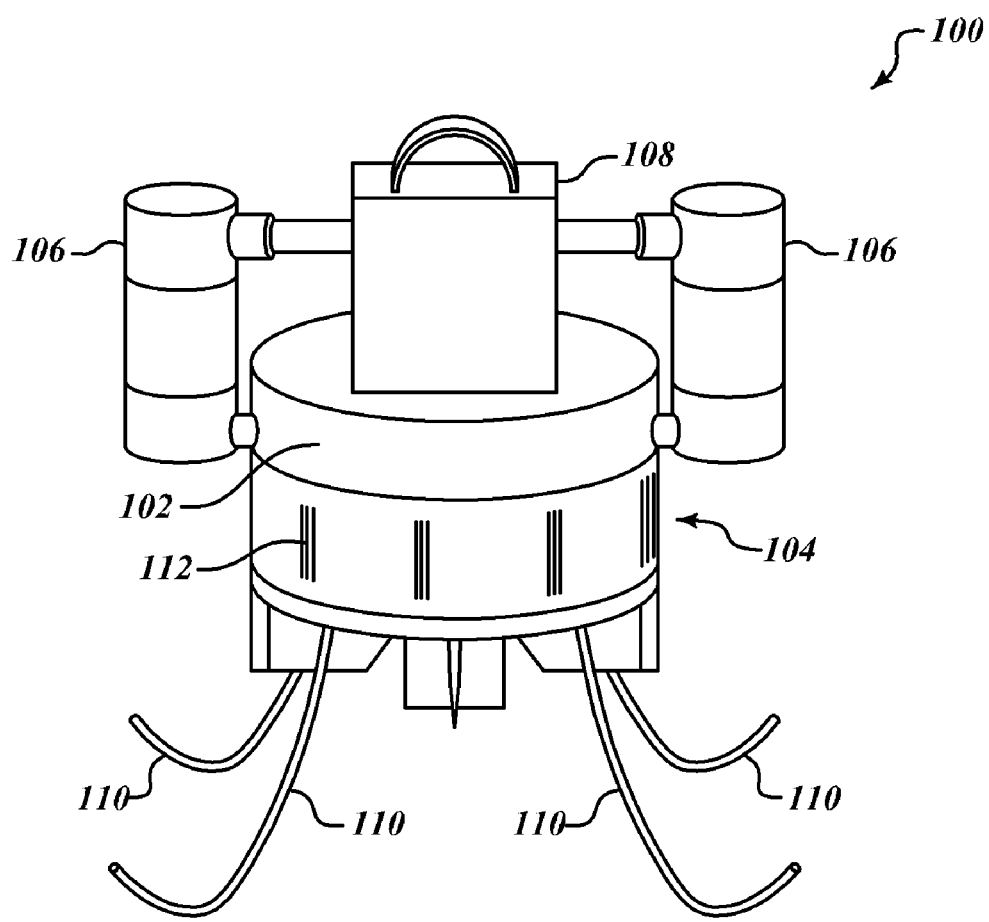
FIG. 1 is front elevational view of a micro air vehicle having a selectively controlled wrap-around antenna according to an illustrated embodiment of the invention.

FIG. 1 is a ducted fan powered MAV 100 having a main body 102 and an antenna 104 according to one embodiment of the present invention. The main body 102 operates as a fan cowling and is coupled to propulsion units 106 and a control unit 108. The MAV 100 has the ability to vertically lift off and land using flexible legs 110 extending from the main body 102. A radar altimeter (not shown), which may be a pulsed or a FMCW radar altimeter, is located within the control unit 108 in one embodiment of the present invention. The radar altimeter includes a control means (not shown) for selectively controlling a center frequency of the radar altimeter. In one embodiment, the center frequency is within a radio wave band on the electromagnetic spectrum. The antenna 104 is wrapped around the main body 102 and includes radiating elements 112 that cooperate with the center frequency transmitted by the radar altimeter as explained in more detail below.

Figure 2:
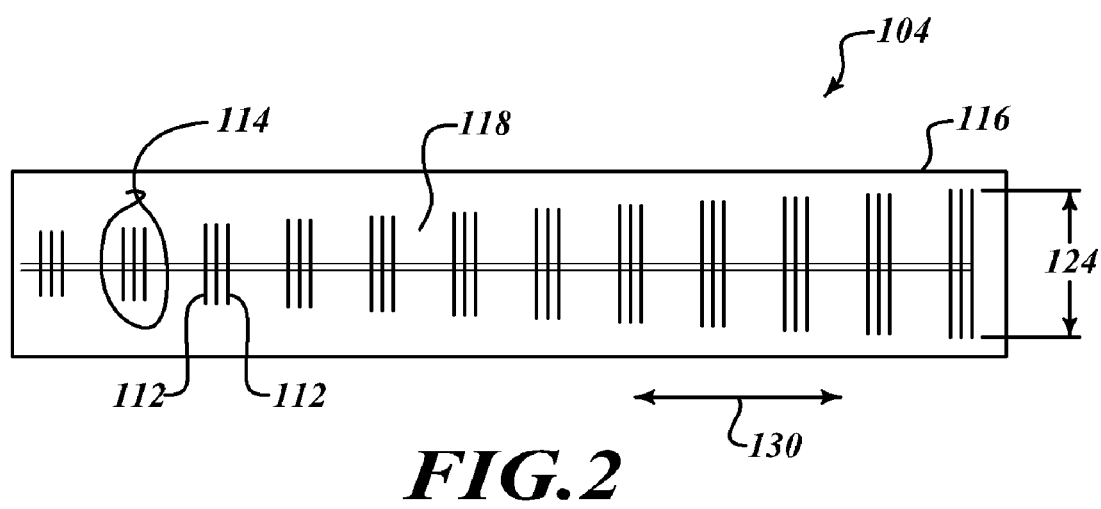
FIG. 2 is a side plan view of the antenna of FIG. 1 in an unwrapped configuration according to an illustrated embodiment of the invention.

FIG. 2 shows the antenna 104 that operates to selectively emit or scan signals from different portions of the antenna 104 by placing the radiating elements 112 into groups 114 onto a wrap-around material 116. One purpose of the antenna 104 is to operate as a rough proximity sensor that senses a direction to an object and may determine an approximate range of the object relative to a frame of reference on the MAV 100. In one embodiment, the radiating elements 112 may take the form of printed copper patterns or equivalent other patterns Likewise, the wrap-around material 116 may take the form of a Teflon-Copper material coupled with flame retardant fiberglass epoxy, such as FR4 fiberglass epoxy or equivalent other material. The antenna 104 may be attached to the body 102 by a variety of methods such as, but not limited to, rivets placed through edge portions of the antenna 104 and into the body 102, adhesives, or a combination of both.

Figure 3:
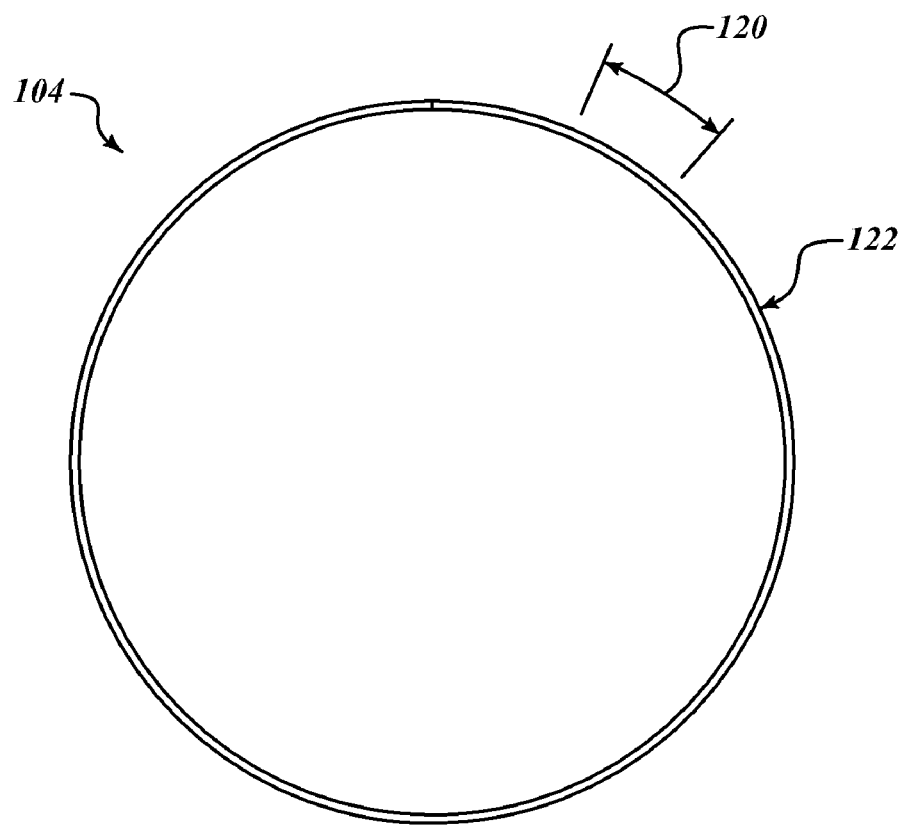
FIG. 3 is a top plan view of the antenna of FIG. 1 in a wrapped configuration.

Each group 114 of radiating elements 112 radiates at or about the same frequency. Further, each group 114 is spaced apart by a gap or space 118 from an adjacent group and this spacing 118 in combination with the center frequency of the radar altimeter determines which general direction the antenna 104 will radiate. The space 118 between the groups 114 of radiating elements 112 may be selectively determined to cause the radiation from the antenna 104 to be confined to a small range of angles or angular sector 120 (FIG. 3) relative to an outer surface 122 (FIG. 3) of the antenna 104. Further and advantageously, the spacing 116 between the groups 114 of radiating elements 112 may be selected to reduce or even eliminate radio wave leakage between adjacent groups of radiating elements.

Figure 4:
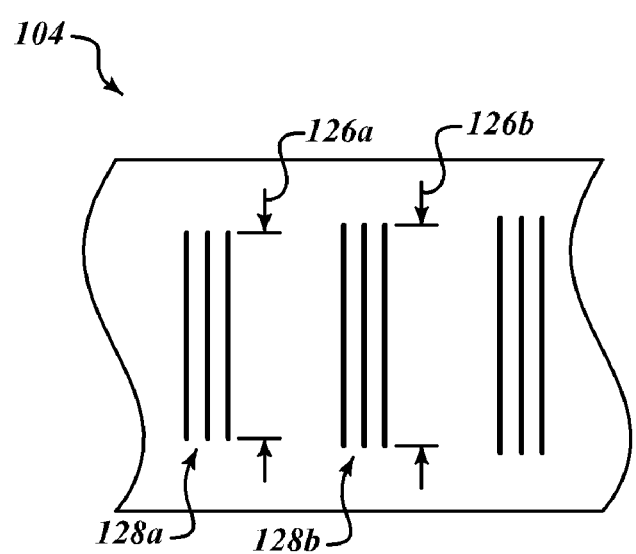
FIG. 4 is a portion of the antenna of FIG. 1 to better show relative height differences between groups of radiating elements.

Still referring to FIG. 2, the radiating elements 112 are arranged such that three radiating elements 112 comprise one group 114. It is appreciated, however, that greater or fewer radiating elements 112 may be arranged into the one group 114. Within each group 114, the radiating elements 112 are the same or substantially the same height 124. In addition and briefly referring to FIG. 4, an average height 126a of first group 128a is different (e.g., taller or shorter) than an average height 126b of an adjacent group 128b. Radiating elements 112 of different heights radiate at different frequencies. In one embodiment, the height 124 of radiating elements 112 may be selected to be equal to or approximately equal to one-half wave length of a desired frequency. Thus, along the length of the antenna 104, the heights of the radiating elements 112, either individually or as arranged within spaced apart groups 114, may be tapered such that the radar emitting direction or sector 120 (FIG. 3) of the antenna 104 depends on the center frequency of the radar altimeter. Accordingly, the center frequency of the radar altimeter may be controlled in a deterministic manner such that a select group or groups 114 of radiating elements 112 on the antenna 104 will radiate more efficiently than other groups 114 of different heights 124. And, the "efficient group" 114 may be controllably moved across the antenna 104 from a first direction to a second direction, or vice-versa, as indicated by arrow 130 and thus effectively change a direction of desired radiation emission.

Alternatively stated, tapering the heights of the radiating elements 112 in the lengthwise direction 130 of the antenna 104 (e.g., in a circumferential direction around the MAV 100 when the antenna 104 is wrapped therearound), the direction 120 of radiation becomes dependent on frequency. Consequently, the illustrated embodiment of the radiating elements 112, as well as other non-illustrated embodiments, as arranged on the wrap-around material 116 advantageously permits controlling the center frequency of the radar altimeter to selectively control a sectoral coverage area 120 of the signal emitted from the antenna 104 without using complex directional antennas, complex frequency switching devices, or both.

In an alternate embodiment, frequency selective traps (not shown) may be coupled to the antenna 104 to provide enhanced or additional control over which radiating elements 112 operate most efficiently based on a selected center frequency of the radar altimeter. The traps may take the form of a frequency selective resonant circuit. Although the variation in the length of the groups of radiating elements results in naturally frequency selective radiating elements, when the difference in length of adjacent groups of radiating elements is small, the adjacent groups of antennas may still radiate slightly. The radiation from these elements is not desirable and distorts both the shape of the energy radiated from the antenna and the direction that energy is radiated. By placing a highly frequency selective resonant circuit between the feed point for a group of radiating elements and the additional frequency selective resonant circuits is tuned to the preferred radiating frequency of that group of radiating elements, the other radiating elements that are tuned to different frequencies receive less energy. Hence, the undesirable radiation from adjacent elements is suppressed and the energy radiated form the antenna comes from only one group of radiating elements and thereby preserves both the shape of the radiated energy and the direction.

In another embodiment, radio frequency (RF) switches (not shown) may be used to replace the radiating elements 112 to form a beam-steered antenna. In such an embodiment, the antenna 112 would be transformed from a passive device to a complex, active antenna requiring control signals and likely an increase in overall weight for the MAV 100.

Advantageously, the antenna 104 may eliminate conventional directional antennas and their associated switches used to achieve directional coverage at the expense of precision direction information. By arranging the radiating elements 112 in groups 114 and selectively spacing 118 the groups apart from one another, the amount of resolution of the antenna may be enhanced or increased while an amount of radiation leakage from one group to an adjacent group may be reduced or even eliminated.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A radar ranging system for an air vehicle, the system comprising:
    a radar altimeter operable to selectively control a center frequency of a signal output by the altimeter;
    an elongated antenna having a first end, a second end and an elongated portion extending from the first end to the second end, the elongated portion having a length sufficient to permit the antenna to be wrapped around a portion of the micro air vehicle such that the first end is positioned proximate the second end; and
    a plurality of radiating elements coupled to the elongated antenna, the radiating elements arranged in at least two groups, each group spaced apart from an adjacent group as arranged along the length of the antenna, wherein each group has an average height that is at least slightly different than an average height of another group, the radiating elements in signal communication with the radar altimeter and responsive to changes in the center frequency to selectively change a signal coverage area relative to a frame of reference on the micro air vehicle of a radio signal emitted from the radiating elements relative to the micro air vehicle.

2. The radar ranging system of claim 1, wherein the radar altimeter is a pulsed radar altimeter.

3. The radar ranging system of claim 1, wherein the radar altimeter is a frequency modulated continuous wave (FMCW) radar altimeter.

4. The radar ranging system of claim 1, wherein the elongated antenna extends circumferentially around a substantially cylindrical body of the micro air vehicle.

5. The radar ranging system of claim 1, wherein different height radiating elements emit radio signals at different frequencies, and wherein the height of the radiating element corresponds to a desired frequency.

6. The radar ranging system of claim 1, wherein a spacing between the groups of radiating elements is selected to prevent an undesired amount of leakage.

7. The radar ranging system of claim 1, wherein the average height of each group of radiating elements successively and incrementally decreases from the first end toward the second end of the elongated antenna.

8. The radar ranging system of claim 1, wherein the average height of each group of radiating elements successively and incrementally decreases from the second end toward the first end of the elongated antenna.

9. A radar ranging system for an air vehicle, the system comprising:
    a radar altimeter operable to selectively control a center frequency of a signal output by the altimeter;
    an elongated antenna having a first end, a second end and an elongated portion extending from the first end to the second end, the elongated portion having a length sufficient to permit the antenna to be wrapped around a portion of the micro air vehicle such that the first end is positioned proximate the second end; and
    a plurality of radiating elements arranged by height along the length of the antenna, the radiating elements in signal communication with the radar altimeter and responsive to changes in the center frequency to selectively operate a desired group of radiating elements to provide a signal coverage area relative to a frame of reference of the micro air vehicle, the signal coverage area comprising radio signals emitted from the antenna at a radio frequency corresponding to the center frequency.

10. The radar ranging system of claim 9, wherein the elongated antenna extends circumferentially around a substantially cylindrical body of the micro air vehicle.

11. The radar ranging system of claim 9, wherein the plurality of radiating elements arranged by height along the length of the antenna are arranged in spaced apart groups.

12. The radar ranging system of claim 11, wherein each group includes an average height that is different from an average height of an adjacent group.

13. The radar ranging system of claim 12, wherein the different height groups of radiating elements emit radio signals at different frequencies.

14. The radar ranging system of claim 11, wherein a spacing between the groups of radiating elements is selected to prevent a desired amount of leakage.

15. The radar ranging system of claim 11, wherein the air vehicle is a micro air vehicle.

16. A method for operating a micro air vehicle, the method comprising:
    selecting a desired frequency for a radio signal output by a radio altimeter of the micro air vehicle; controllably changing the desired frequency to move an emitted radio signal from a first group of radiating elements to a second group of radiating elements; and
    covering a sector of space relative to the micro air vehicle with the emitted radio signals to determine a proximity of the micro air vehicle from an object.

17. The method of claim 16, wherein selecting the desired frequency for the radio altimeter includes selecting a desired radio frequency.

18. The method of claim 16, wherein controllably changing the desired frequency includes controllably changing a center frequency of the radio altimeter.

19. The method of claim 16, wherein the first group of radiating elements includes an average height different from an average height of the second group of radiating elements.

20. The method of claim 16, wherein covering the sector of space relative to the micro air vehicle includes covering angular spatial area relative to a cylindrically shaped body of the micro air vehicle.

* * * * *